(12) United States Patent
Bayer et al.

(10) Patent No.: US 7,217,903 B2
(45) Date of Patent: May 15, 2007

(54) METHOD FOR PURIFYING GAS USING PLASMA DISCHARGE

(75) Inventors: Erwin Bayer, Dachau (DE); Joerg Hoeschele, Meckenbeuren (DE); Juergen Steinwandel, Uhldingen-Muehlhofen (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 10/497,074

(22) PCT Filed: Nov. 29, 2002

(86) PCT No.: PCT/DE02/04396

§ 371 (c)(1),
(2), (4) Date: Feb. 8, 2005

(87) PCT Pub. No.: WO03/047727

PCT Pub. Date: Jun. 12, 2003

(65) Prior Publication Data

US 2005/0139593 A1   Jun. 30, 2005

(30) Foreign Application Priority Data

Dec. 1, 2001   (DE) ............................. 101 59 152

(51) Int. Cl.
*B23K 10/00* (2006.01)

(52) U.S. Cl. ................... 219/121.36; 219/121.59; 219/121.5; 315/111.51; 110/246; 588/900

(58) Field of Classification Search .......... 219/121.59, 219/121.54, 121.43, 121.36, 121.48; 315/111.51; 156/345.2; 118/723 MW, 723 I; 422/171–177; 110/246, 256; 588/900
See application file for complete search history.

(56) References Cited

U.S. PATENT DOCUMENTS

| | | | |
|---|---|---|---|
| 4,916,273 A * | 4/1990 | Browning .............. | 219/121.47 |
| 5,349,154 A * | 9/1994 | Harker et al. ............... | 117/102 |
| 5,387,775 A | 2/1995 | Kang | |
| 5,478,532 A | 12/1995 | Uhm | |
| 5,611,947 A * | 3/1997 | Vavruska ............... | 219/121.52 |
| 5,782,085 A | 7/1998 | Steinwandel et al. | |
| 6,153,852 A * | 11/2000 | Blutke et al. .......... | 219/121.59 |
| 6,340,863 B1 | 1/2002 | Ikeda et al. | |
| 6,552,295 B2 * | 4/2003 | Markunas et al. ...... | 219/121.36 |
| 6,617,538 B1 * | 9/2003 | Mahawili ............... | 219/121.36 |
| 2002/0189928 A1 * | 12/2002 | Cha ........................ | 204/157.3 |
| 2003/0222586 A1 * | 12/2003 | Brooks et al. .......... | 315/111.71 |

FOREIGN PATENT DOCUMENTS

| | | |
|---|---|---|
| DE | 43 19 118 | 12/1994 |
| DE | 44 28 418 | 2/1996 |
| DE | 195 13 250 | 10/1996 |
| DE | 101 40 298 | 3/2003 |
| EP | 0 295 083 | 12/1988 |
| EP | 0 785 016 | 7/1997 |
| EP | 0 839 929 | 5/1998 |
| WO | WO 00/62904 | 10/2000 |

* cited by examiner

*Primary Examiner*—Mark Paschall
(74) *Attorney, Agent, or Firm*—Crowell & Moring LLP

(57) ABSTRACT

A method is provided for purifying gases, particularly gases contaminated by environmentally harmful substances, by way of plasma discharge. The gas to be purified is guided through a thermal plasma, which is generated by electrodeless ignition of a process gas, so that, by way of the thermal plasma, the harmful substances contained in the gas to be purified are converted to environmentally neutral, fully oxidized substances.

18 Claims, 1 Drawing Sheet

METHOD FOR PURIFYING GAS USING PLASMA DISCHARGE

BACKGROUND AND SUMMARY OF THE INVENTION

This invention relates to a method of purifying gases.

During the past few years, the increasing importance of environmental protection as led to the establishment of a number of methods for removing emissions, for example, of organic solvents, in exhaust air. In European Patent Document EP 0 785 016 A1, a high-expenditure method is described of removing harmful-substance-containing exhaust air by combining a biological purification stage with a non-thermal plasma purification stage. Another disadvantage of the method described in European Patent Document EP 0 785 016 A1 is that, as a result of the non-thermal plasma, the harmful substances are only partially oxidized, whereby toxic constituents can be formed. For purifying these constituents, additional moderators are used which result in higher constructional expenditures.

Furthermore, methods are known in which thermal plasmas are used for purifying gases. In this case, the gas to be purified is guided into the thermal plasma produced between two electrodes, for example, of an arc torch. Here, the disadvantage is that, because of the high gas velocity of the plasma and of the high density gradient, the gas to be purified can only insufficiently penetrate into the hot plasma zones.

Another method in which a plasma is combined with a catalyst for purifying exhaust air is known from the PLASMACAT®-Method of the firm Up-To-Date-Umwelttechnik AG. Another method of purifying gas by means of a dielectrically hindered discharge is described in U.S. Pat. No. 5,387,775.

It is an object of the invention to provide a method by which purification of harmful-substance-containing air which is simpler and more effective in comparison to the prior art can be achieved.

This object is achieved by the method claimed. Advantageous embodiments of the method according to the invention are also claimed.

According to the invention, the gas to be purified is guided through a thermal plasma, in which case the plasma is produced by means of an electrodeless ignition of a process gas, so that the harmful substances contained in the gas to be purified can be converted by means of the thermal plasma into environmentally neutral, fully oxidized substances.

It is an advantage of the method according to the invention that, because of the high plasma temperatures, which are in the range of several 10,000 K, the harmful substances, which normally consist of long-chain CH compounds, are split into individual environmentally compatible CH fragments; this is also called cracking.

It is another advantage that no additional filters or moderators are required. As a result, the method according to the invention is simpler and more cost-effective than conventional methods.

Since, according to the invention, the plasma is produced in an electrodeless manner, no expendable parts, such as the electrodes of an arc torch, are required. Thus, possible reactions of the harmful substances with the electrodes, which, particularly in the case of tungsten electrodes in conventional arch torches, would result in the formation of toxic constituents, are avoided.

In an advantageous embodiment of the method according to the invention, the process gas required for igniting the plasma contains oxygen and/or nitrogen. In this case, air can expediently be used as the process gas. However, it is also conceivable to use process gases with other stoichiometric ratios.

In an advantageous embodiment of the invention, the thermal plasma can be ignited by resonant coupling of high-frequency microwaves to the process gas. Such an ignition is known, for example, from German Patent Document DE 195 13 250 A1.

However, in another advantageous embodiment of the invention, the thermal plasma can also be ignited by inductive coupling of radio waves to the process gas. Such a method is known from German Patent Document DE 101 40 298.8, which is not a prior publication.

The method according to the invention can be used particularly for purifying gases and vapors which occur during the bath maintenance of plating or degreasing baths. Naturally, the method according to the invention can also be used in other fields of application in which the purification of harmful-substance-containing exhaust air or exhaust air detrimental to people's health is required.

The invention as well as additional advantageous embodiments of the invention will be explained in detail by means of drawings.

DETAILED DESCRIPTION OF THE INVENTION

Figure 1:
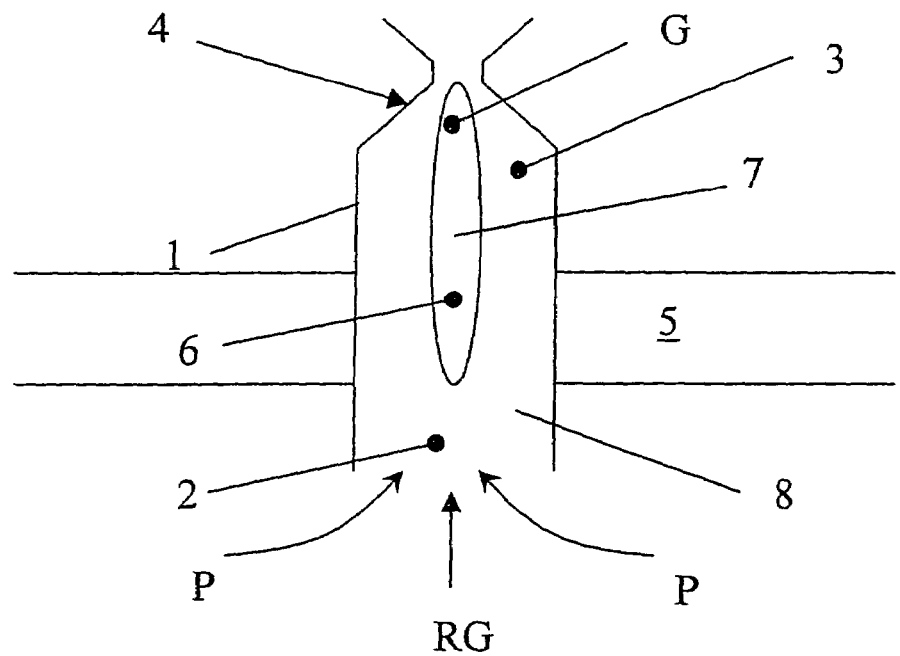
FIG. 1 is a sectional view of a first embodiment of the method according to the invention, in which the process gas is ignited by means of microwaves.

FIG. 1 is a sectional view of a first device, which is used as an example, for implementing the method according to the invention. A dielectric microwave-transparent tube 1 is advantageously present which has a gas inlet opening 2 and a gas outlet opening 3. Advantageously, the process gas P is introduced into the tube 1 through the gas inlet opening 2, the introduction of the process gas P taking place such that it advantageously has a tangential flow component and an axial flow component which flows in the direction of the gas outlet opening 3. A metallic expansion nozzle 4 is advantageously mounted on the gas outlet opening 3 of the tube 1.

The tube 1 is expediently situated in a waveguide 5 in which the microwaves are transported which are generated by a microwave source which is not shown. As a result of the absorption of microwave energy, a thermal microwave plasma 7 is ignited in the area 6 in which the tube 1 is situated in the waveguide 5. In this case, the microwave source can be operated continuously or in a pulsed manner.

The gas RG to be purified is advantageously guided through the gas inlet opening 2 into the tube 1 and thus through the area 6 in which the plasma 7 is burning. In this area 6, the purification of the harmful-substance-containing gas RG takes place, the harmful substances being cracked into individual, environmentally compatible fragments. This gas mixture consisting of the plasma 7, the purified gas G and the fragments flows through the expansion nozzle 4 at the gas outlet opening 3 of the tube 1. In the process, the gas mixture is expanded, whereby particularly a recombination of the fragments existing in the gas mixture to toxic substances is prevented.

Figure 2:
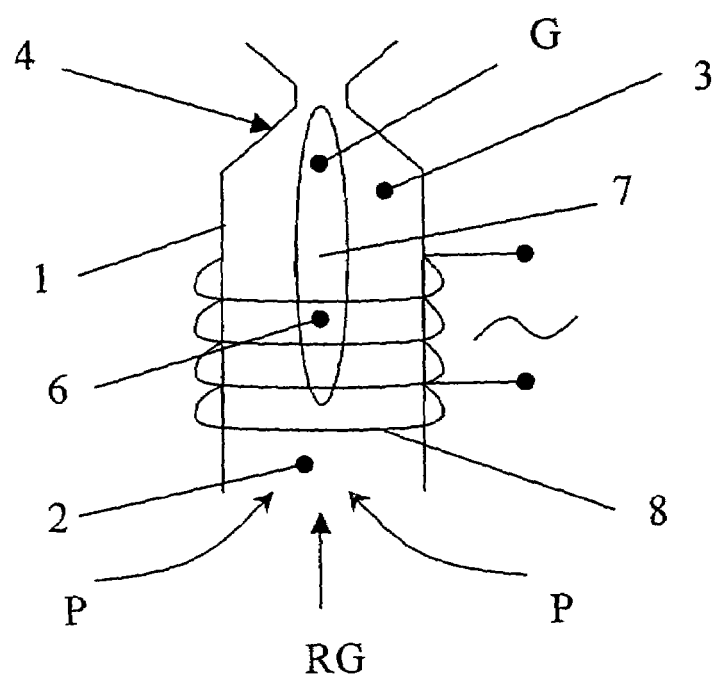
FIG. 2 is a sectional view of a second embodiment of the method according to the invention, in which the process gas is ignited by means of radio waves.

The embodiment illustrated in FIG. 2 corresponds essentially to the embodiment illustrated in FIG. 1. However, in FIG. 2, a coupling coil 8 is wound around the tube 1. Furthermore, the tube 1 advantageously is radio-wave-transparent. Thus, corresponding to the embodiment in FIG. 1, a thermal rf-plasma 7 is generated by means of the absorption of radio energy in the area 6.

The invention claimed is:

1. A method of purifying a gas contaminated by an environmentally harmful substance comprising:
   generating a thermal plasma by electrodeless ignition of a process gas,
   guiding the gas to be purified through the thermal plasma so that, by way of the thermal plasma, the harmful substance contaminating the gas to be purified is converted to an environmentally neutral, fully oxidized substance, and
   preventing recombination of fragments after conversion of the gas to the harmful substance.

2. The method according to claim 1, wherein the process gas contains at least one of oxygen and nitrogen.

3. The method according to claim 1, wherein the plasma is ignited by a resonant coupling of high-frequency microwaves to the process gas.

4. The method according to claim 1, wherein the plasma is ignited by an inductive coupling of radio waves to the process gas.

5. The method according to claim 1, wherein the plasma is ignited in a dielectric, microwave-transparent or radio-wave-transparent tube which has a gas inlet opening and a gas outlet opening, and wherein the process gas is fed into the tube through the gas inlet opening such that the process gas has a tangential flow component.

6. The method according to claim 5, wherein the gas to be purified is introduced into the plasma through the gas inlet opening of the tube.

7. The method according to claim 5, wherein the plasma and the gas purified by the plasma are guided through a metallic expansion nozzle present at the gas outlet opening to prevent said recombination.

8. The method according to claim 2, wherein the plasma is ignited by a resonant coupling of high-frequency microwaves to the process gas.

9. The method according to claim 2, wherein the plasma is ignited by an inductive coupling of radio waves to the process gas.

10. The method according to claim 2, wherein the plasma is ignited in a dielectric, microwave-transparent or radio-wave-transparent tube which has a gas inlet opening and a gas outlet opening, and wherein the process gas is fed into the tube through the gas inlet opening such that the process gas has a tangential flow component.

11. The method according to claim 10, wherein the gas to be purified is introduced into the plasma through the gas inlet opening of the tube.

12. The method according to claim 10, wherein the plasma and the gas purified by the plasma are guided through a metallic expansion nozzle present at the gas outlet opening to prevent said recombination.

13. The method according to claim 3, wherein the plasma is ignited in a dielectric, microwave-transparent or radio-wave-transparent tube which has a gas inlet opening and a gas outlet opening, and wherein the process gas is fed into the tube through the gas inlet opening such that the process gas has a tangential flow component.

14. The method according to claim 13, wherein the gas to be purified is introduced into the plasma through the gas inlet opening of the tube.

15. The method according to claim 13, wherein the plasma and the gas purified by the plasma are guided through a metallic expansion nozzle present at the gas outlet opening to prevent said recombination.

16. The method according to claim 4, wherein the plasma is ignited in a dielectric, microwave-transparent or radio-wave-transparent tube which has a gas inlet opening and a gas outlet opening, and wherein the process gas is fed into the tube through the gas inlet opening such that the process gas has a tangential flow component.

17. The method according to claim 16, wherein the gas to be purified is introduced into the plasma through the gas inlet opening of the tube.

18. The method according to claim 16, wherein the plasma and the gas purified by the plasma are guided through a metallic expansion nozzle present at the gas outlet opening to prevent said recombination.

* * * * *